(12) United States Patent
Felt et al.

(10) Patent No.: US 7,213,049 B2
(45) Date of Patent: May 1, 2007

(54) SYSTEM AND METHOD FOR TRANSACTION PROCESSING WITH TRANSACTION PROPERTY FEATURE

(75) Inventors: Edward P. Felt, deceased, late of Matawan, NJ (US); by Sandra V. Felt, legal representative, Matawan, NJ (US); Priscilla Fung, Union City, CA (US); Alexander J. Somogyi, Bedminster, NJ (US); Sriram Srinivasan, Berkeley, CA (US)

(73) Assignee: Bea Systems, Inc., San Jose, CA (US)

( * ) Notice: Subject to any disclaimer, the term of this patent is extended or adjusted under 35 U.S.C. 154(b) by 791 days.

(21) Appl. No.: 10/196,687

(22) Filed: Jul. 15, 2002

(65) Prior Publication Data
US 2003/0050972 A1    Mar. 13, 2003

Related U.S. Application Data

(60) Provisional application No. 60/306,102, filed on Jul. 17, 2001.

(51) Int. Cl.
    *G06F 16/16*    (2006.01)
(52) U.S. Cl. ............... 709/203; 709/202; 709/250; 718/101
(58) Field of Classification Search ............... 709/213, 709/220–1, 201–203, 250; 718/101; 719/328–329
    See application file for complete search history.

(56) References Cited

U.S. PATENT DOCUMENTS

| | | | | |
|---|---|---|---|---|
| 5,586,312 A * | 12/1996 | Johnson et al. | ............... | 707/10 |
| 5,764,897 A * | 6/1998 | Khalidi | ........................ | 709/201 |
| 5,857,100 A * | 1/1999 | Phillips et al. | ............... | 718/101 |
| 5,958,004 A * | 9/1999 | Helland et al. | ............. | 718/101 |
| 5,987,502 A | 11/1999 | Banks et al. | ................. | 709/203 |
| 6,038,589 A | 3/2000 | Holdsworth et al. | ........ | 709/201 |
| 6,058,267 A * | 5/2000 | Kanai et al. | ................... | 712/28 |
| 6,101,527 A * | 8/2000 | Lejeune et al. | ............. | 709/201 |
| 6,243,737 B1 * | 6/2001 | Flanagan et al. | ........... | 709/202 |
| 6,266,698 B1 | 7/2001 | Klein et al. | ................. | 709/227 |
| 6,275,863 B1 | 8/2001 | Leff et al. | .................... | 709/248 |
| 6,298,072 B1 | 10/2001 | Koliczew | ..................... | 370/503 |
| 6,308,287 B1 | 10/2001 | Mitchell et al. | .............. | 714/19 |
| 6,338,146 B1 * | 1/2002 | Johnson et al. | ................ | 714/4 |
| 6,411,981 B1 * | 6/2002 | Klein et al. | ................. | 718/101 |
| 6,714,962 B1 * | 3/2004 | Helland et al. | ............. | 709/203 |
| 6,898,574 B1 * | 5/2005 | Regan | ......................... | 705/38 |
| 2002/0038243 A1 | 3/2002 | Amano et al. | | |
| 2002/0087366 A1 | 7/2002 | Collier et al. | | |

* cited by examiner

*Primary Examiner*—Bharat Barot
(74) *Attorney, Agent, or Firm*—Fliesler Meyer LLP (57) ABSTRACT

The invention provides a mechanism for use with a transaction processing system that allows a transaction to include a number of associated transaction properties. Transaction properties in turn allow named objects to be associated with a transaction. Transaction properties are available wherever the transaction is active. They can be used as a form of attachment or out-of-band communication mechanism as a transaction flows to various servers in a distributed system, or between different software modules within a single system.

24 Claims, 7 Drawing Sheets

```
import server.transaction.Transaction;
import server.transaction.TransactionManager;
import server.transaction.TxHelper;
...
TransactionManager tm = TxHelper.getTransactionManager();
Transaction tx;
tm.begin();
tx = (server.transaction.Transaction)tm.getTransaction();
tx.setProperty("rating", "VIP");
```
⌒ 702

FIGURE 8

```
import server.transaction.Transaction;
import server.transaction.TransactionManager;
import server.transaction.TxHelper;
...
int balance;
...
TransactionManager tm = TxHelper.getTransactionManager();
Transaction tx;
tx = (server.transaction.Transaction)tm.getTransaction();
String rating = (String)tx.getProperty("rating");

if (balance < 0 && rating.equals("VIP") {
  // Overdrawn VIP customer gets special treatment
}
```
⌒ 802

FIGURE 9

SYSTEM AND METHOD FOR TRANSACTION PROCESSING WITH TRANSACTION PROPERTY FEATURE

CLAIM OF PRIORITY

This application claims priority from provisional application "SYSTEM FOR TRANSACTION PROCESSING WITH TRANSACTION PROPERTY FEATURE," Application No. 60/306,102, filed Jul. 17, 2001, and which application is incorporated herein by reference.

FIELD OF THE INVENTION

The invention relates generally to application and transaction servers and particularly to a system for including transaction properties with a transaction or message.

CROSS REFERENCE

This application is related to copending utility applications "SYSTEM FOR TRANSACTION PROCESSING WITH DELEGATED COMMIT FEATURE", application Ser. No. 10/196,297, Inventors: Edward P. Felt, Priscilla Fung, Alex Somogyi, and Sriram Srinivasan, filed Jul. 15, 2002, and subsequently issued as U.S. Pat. No. 7,080,119; and "SYSTEM FOR TRANSACTION PROCESSING WITH SYNCHRONIZED CALLBACK PROCESSING FEATURE", application Ser. No. 10/196,322, Inventors: Edward P. Felt, Priscilla Fung, Alex Somogyi, and Sriram Srinivasan, filed Jul. 15, 2002; both of which are herein incorporated by reference, in their entirety.

BACKGROUND OF THE INVENTION

The Java 2 Platform, Enterprise Edition (J2EE) specification defines one of the current standards for developing multi-tier enterprise applications. J2EE provides a component-based approach to the design, development, assembly, and deployment of enterprise applications, which both reduces the cost and enables faster design and implementation. The J2EE platform gives the developer a multi-tiered distributed application model, the ability to reuse components, a unified security model, and flexible transaction control. Not only can they deliver innovative customer solutions to market faster than ever, but the resultant platform-independent J2EE component-based solutions are not tied to the products and application program interfaces (APIs) of any one vendor.

Figure 1:
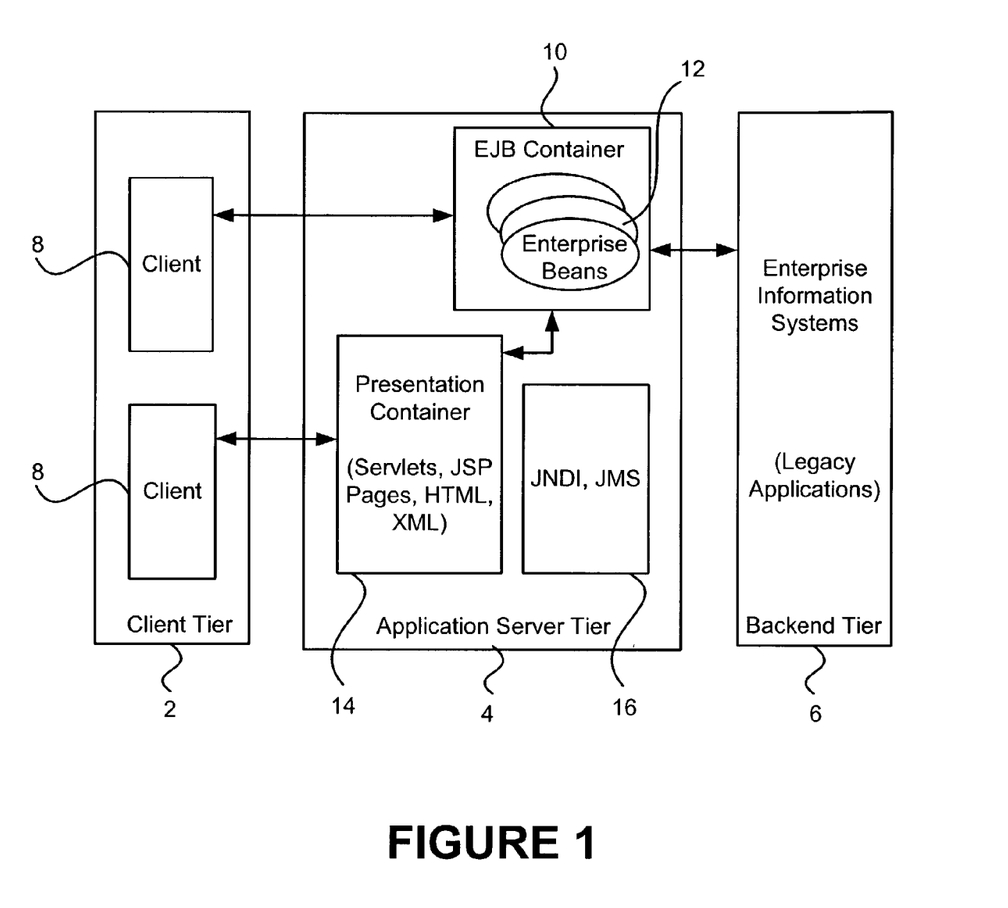
FIG. 1 shows an illustration of the J2EE architecture.

The J2EE specification defines the following kinds of components: application client components; Enterprise JavaBeans (EJB); servlets and Java Server Pages (JSP) (also called Web components); and applets. A multi-tiered distributed application model implies that the application logic is divided into components according to function, and different application components may make up a J2EE application on the same or different servers. Where an application component is actually installed depends on which tier in the multi-tiered J2EE environment the application component belongs. These tiers are depicted in FIG. 1. As shown therein an application server tier 4 is used to develop EJB containers and/or presentation containers such as servlets, JSP, and html pages 14. These in turn are used as an interface between a client tier 2, where the clients 8 and client applications are deployed, and a backend tier 6, used for hosting enterprise or legacy applications such Enterprise Resource Planning (ERP) systems.

Client tier—These can be browsers, Java-based programs, or other Web-enabled programming environments running within the client tier, both inside and outside of corporate firewalls.

Application Server tier—Normally this tier hosts a combination of presentation logic and business logic to support client requests. Presentation logic is supported via JSP pages and servlets that display HTML pages, while business logic is supported via Remote Method Invocation (RMI) objects and EJBs 12. EJBs rely upon the container environment for transactions, lifecycle and state management, resource pooling, security, etc., which together make up the run time environment in which the beans are executed.

Back-end tier—This is generally a combination of existing applications and data stores. It is also referred to as the Enterprise Information Systems (EIS) tier, since it may include such systems as Enterprise Resource Planning (ERP), mainframe transaction processing, database systems, and other legacy information systems.

Since the components of a J2EE application run separately, and often on different devices, there needs to be a way for client and application server tier code to look up and reference other code and resources. Client and application code can, for example, use the Java Naming and Directory Interface (JNDI) 16 to look up user-defined objects such as enterprise beans, and environment entries such as the location of the Java Database Connector (JDBC) DataSource objects, which in turn are used for looking up resources in backend tier, and message connections.

Application behavior such as security and transaction management can be configured at deployment time on Web and enterprise bean components. This deployment time feature decouples application logic from the configuration settings that might vary with the assembly. The J2EE security model lets a developer configure a Web or enterprise bean component so that system resources are accessed only by authorized users. For example, a Web component can be configured to prompt for a user name and password. An Enterprise Bean component can be configured so that only persons in specific groups can invoke certain kinds of its methods. Alternatively, a servlet component might be configured to have some of its methods accessible to everyone, and a few methods accessible to only certain privileged persons in an organization. The same servlet component can be configured for another environment to have all methods available to everyone, or all methods available to only a select few.

Some application servers, such as the WebLogic Server product from BEA Systems, Inc., San Jose, Calif., use an Access Control List (ACL) mechanism that allows for fine-grained control of the usage of components running on the server. Using an ACL, a developer can define at the Java Method level what can, or cannot, be executed by which user or group of users. This ACL mechanism covers anything that runs on the application server except for EJBs, which have their own access control mechanism defined in the EJB specification. Security realms allow the administrator to import information from existing authorization or authentication systems into the ACL.

Java Servlets

A servlet is a program that extends the functionality of a Web server. A servlet receives a request from a client, dynamically generates the response (possibly querying databases to fulfill the request), and then sends the response containing an HTML or XML document to the client. Servlets are similar to CGI but are typically easier to write, since servlets use Java classes and streams. They execute faster because servlets are compiled to Java byte code and at run time the servlet instance is kept in memory, each client request running in a separate thread. Servlets make it easy to generate data to an HTTP response stream in a dynamic fashion. Each client request is performed as a new connection, so flow control does not come naturally between requests. To allow for this session management maintains the state of specific clients between requests. In some application servers, servlets make use of the HTTP session object to save their state between method requests. This object can be replicated in a clustered environment for failover purposes.

Java Server Pages

JSP pages are a text-based, presentation-centric way to develop servlets. JSP pages offer all the benefits of servlets, and when combined with a JavaBeans class, provide an easy way to keep content and display logic separate. Both JSP pages and servlets are more desirable than Common Gateway Interface (CGI), because they are platform-independent, and use less overhead. JSP pages can be used with JavaBeans classes to define Web templates for building a Web site made up of pages with a similar look and feel. The JavaBeans class performs the data rendering, so the templates have no Java code. This means they can be maintained by an HTML editor. Simple Web-based application using a JSP page can be used to bind content to application logic using custom tags or scriptlets instead of a JavaBeans class. Custom tags are bundled into tag libraries that are imported into a JSP page. Scriptlets are small Java code segments embedded directly in the JSP page.

Database Access Services (JDBC)

JDBC acts as a bridge to relational databases, and is modeled on the ODBC (Open Database Connectivity) specification. It decouples the database from the program code through the use of drivers. Some implementations of JDBC provide support for advanced data types, and also support the functionality of scrollable result sets and batch updates.

Java Messaging Services (JMS)

JMS is the J2EE mechanism used to support the exchange of messages between Java programs. This is how Java supports asynchronous communication, wherein the sender and receiver don't need to be aware of each other and thus can operate independently. JMS supports two messaging models:

Point to point—which is based on message queues. In this model message producer sends a message to a queue. A message consumer can attach itself to a queue to listen for messages. When a message arrives on the queue, the consumer takes it off the queue and responds to it. Messages can be sent to just one queue and will be used by just one consumer. Consumers have the option to filter messages to specify the exact message types they want.

Publish and subscribe—which allows producers to send messages to a topic and for all the registered consumers for that topic to retrieve those messages. In this case, many consumers can receive the same message.

Java Interface Definition language (IDL)

CORBA objects use an IDL to specify a contract, ie. how they are going to interact with other objects. With Java IDL, contracts may be defined between the Java world and the CORBA world. Starting with Sun's JDK1.2, an ORB is included, which allows Java applications to invoke remote CORBA objects via the Internet InterORB (IIOP) protocol.

Enterprise JavaBeans (EJB)

EJB components are designed to encapsulate business logic, so that the developer does not have to be concerned with programming code for typical tasks such as database access, transaction support, security, caching, and concurrency. In the EJB specification these tasks are the responsibility of the EJB container. An enterprise bean consists of interfaces and classes. Clients access enterprise bean methods through the enterprise bean's home and remote interfaces. The home interface provides methods for creating, removing, and locating the enterprise bean and the remote interface provides the business methods. At deployment time, the container creates classes from these interfaces that it then uses to provide access to clients seeking to create, remove, locate, and call business methods on the enterprise bean. The enterprise bean class provides the implementations for the business methods, create methods, and finder methods; and if the bean manages its own persistence, provides implementations for its lifecycle methods.

There are two types of enterprise beans: entity beans and session beans. A session bean represents a transient conversation with a client, and might execute database reads and writes. A session bean can invoke the JDBC calls itself, or it can use an entity bean to make the call, in which case the session bean is a client to the entity bean. A session bean's fields contain the state of the conversation and are transient. If the server or client crashes, the session bean is gone.

An entity bean represents data in a database and the methods to act on that data. In a relational database context for a table of employee information, there may be one bean for each row in the table. Entity beans are transactional and long-lived. As long as the data remains in the database, the entity bean exists. This model can be easily used for relational databases and is not restricted to object databases.

Session beans can be stateful or stateless. A stateful session bean contains conversational state on behalf of the client. The conversational state is the session bean's instance field values plus all objects reachable from the session bean's fields. Stateful session beans do not represent data in a persistent data store, but they can access and update data on behalf of the client. Stateless session beans do not have any state information for a specific client. They typically provide server-side behavior that does not maintain any particular state. Stateless session beans require fewer system resources. A business object that provides a generic service or represents a shared view of stored data is a good candidate for a stateless session bean.

An enterprise bean using container-managed persistence to access a relational database does not require the developer to use any JDBC 2.0 APIs for database access because the container handles this. However, if bean-managed persistence is used, or if there is a need to access an enterprise information system other than a relational database, then the appropriate code to do it must be provided.

In the case of an enterprise bean using bean-managed persistence to access a database, the bean's lifecycle methods with JDBC 2.0 API code must be implemented to handle loading and storing data and maintaining consistency between the run time and persistent database storage. While the Web tier uses HTTP or HTTPS to transfer data between tiers, the EJB tier uses RMI-IIOP. RMI-IIOP is a full-scale distributed computing protocol that gives any client or Web tier program accessing an enterprise bean direct access to the services in the EJB tier. These services include JNDI for referencing enterprise beans, Java Messaging Service (JMS) for sending and receiving asynchronous messages, and JDBC for relational database access.

Transaction Management

One of the most fundamental features of any application server, such as the WebLogic Server system is transaction management. Transactions are a means to guarantee that database transactions are completed accurately and that they take on all the "ACID" properties of a high-performance transaction, including:

Atomicity—all changes that a transaction makes to a database are made permanent; otherwise, all changes are rolled back.

Consistency—a successful transaction transforms a database from a previous valid state to a new valid state.

Isolation—changes that a transaction makes to a database are not visible to other operations until the transaction completes its work.

Durability—changes that a transaction makes to a database survive future system or media failures.

The J2EE transaction model lets the application developer specify, at deployment time, the relationships among methods which comprise a single transaction, so that all methods in one transaction are treated as a single unit. This is desirable because a transaction is a series of steps that must all complete, or if they do not all complete then all reversed. For example, the developer might have a series of methods in an enterprise bean that move money from one bank account to another, by debiting the first account, and crediting the second account. In this example, they would want the entire transfer operation to be treated as one unit, so that if there is a failure after the debit and before the credit, then the debit is rolled back.

Transaction attributes are specified on an application component during assembly, allowing the developer to group methods into transactions across application components. In this manner application components can be changed within a J2EE application, and the transaction attributes reassigned without changing code. The Java Transaction Service (JTS) and Java Transaction API (JTA) form the basis of the transactional support in J2EE and more specifically for EJB and JDBC 2.0. The JTS specification is a low-level application program interface (API) for transaction management that maps Java to the Object Management Group (OMG) Object Transaction Service. The JTA specification was developed by Sun Microsystems in cooperation with leading industry partners in the transaction processing and database system arena and specifies standard Java interfaces between a transaction manager, the resource manager, the application server, and the transactional applications. Specifically, JTA is a high-level API that consists of two parts:

Transaction Interface—This enables the work done by distributed components to be bound by a global transaction, and is a way of marking or identifying groups of operations constituting a transaction.

XA Resource Interface—an interface based upon the X/Open or XA interface that enables the handling of distributed transactions. These involve the coordination of transactions across more than one resource, such as within or between a database or queue.

Most of the time the developer does not need to be concerned about programming explicit transactions with JTA, since that work is performed through the JDBC and EJB API's handled by the container and configured by the application deployment descriptor. The developer can instead focus on the design of the transaction, rather than on its implementation.

WebLogic Server is an example of an application server that supports both distributed transactions and a two-phase commit protocol for enterprise applications. A distributed transaction is a transaction that updates multiple resource managers (such as databases) in a coordinated manner. In contrast, a local transaction updates a single resource manager. The two-phase commit protocol is a method of coordinating a single transaction across two or more resource managers. It guarantees data integrity by ensuring that transactional updates are committed in all of the participating databases, or are fully rolled back out of all the databases, reverting to the state prior to the start of the transaction. In otherwords, either all the participating databases are updated, or none of them are updated. Distributed transactions involve the following participants:

Transaction originator—initiates the transaction. The transaction originator can be a user application, an Enterprise JavaBean, or a JMS client.

Transaction manager—manages transactions on behalf of application programs. A transaction manager coordinates commands from application programs to start and complete transactions by communicating with all resource managers that are participating in those transactions. When resource managers fail during transactions, transaction managers help resource managers decide whether to commit or roll back pending transactions.

Recoverable resource—provides persistent storage for data. The resource is most often a database.

Resource manager—provides access to a collection of information and processes.

Transaction-aware JDBC drivers are common resource managers. Resource managers provide transaction capabilities and permanence of actions; they are entities accessed and controlled within a distributed transaction. The communication between a resource manager and a specific resource is called a transaction branch.

The first phase of the two-phase commit protocol is called the prepare phase. The required updates are recorded in a transaction log file, and the resource must indicate, through a resource manager, that it is ready to make the changes. Resources can either vote to commit the updates or to roll back to the previous state. What happens in the second phase depends on how the resources vote. If all resources vote to commit, all the resources participating in the transaction are updated. If one or more of the resources vote to roll back, then all the resources participating in the transaction are rolled back to their previous state.

Support for Business Transactions

Transactions are appropriate in the example situations described below (although these situations are merely illustrative and not exhaustive).

As a first example, the client application needs to make invocations on several objects, which may involve write operations to one or more databases. If any one invocation is unsuccessful, any state that is written (either in memory or, more typically, to a database) must be rolled back. For example, consider a travel agent application. The client application needs to arrange for a journey to a distant location; for example, from Strasbourg, France, to Alice Springs, Australia. Such a journey would inevitably require multiple individual flight reservations. The client application works by reserving each individual segment of the journey in sequential order; for example, Strasbourg to Paris, Paris to New York, New York to Los Angeles. However, if any individual flight reservation cannot be made, the client application needs a way to cancel all the flight reservations made up to that point. The client application needs a conversation with an object managed by the server application, and the client application needs to make multiple invocations on a specific object instance. The conversation may be characterized by one or more of the following:

Data is cached in memory or written to a database during or after each successive invocation; data is written to a database at the end of the conversation; the client application needs the object to maintain an in-memory context between each invocation; that is, each successive invocation uses the data that is being maintained in memory across the conversation; at the end of the conversation, the client application needs the ability to cancel all database write operations that may have occurred during or at the end of the conversation.

As an alternate example, consider an Internet-based online shopping cart application. Users of the client application browse through an online catalog and make multiple purchase selections. When the users are done choosing all the items they want to buy, they proceed to check out and enter their credit card information to make the purchase. If the credit card check fails, the shopping application needs a mechanism to cancel all the pending purchase selections in the shopping cart, or roll back any purchase transactions made during the conversation. Within the scope of a single client invocation on an object, the object performs multiple edits to data in a database. If one of the edits fails, the object needs a mechanism to roll back all the edits. (In this situation, the individual database edits are not necessarily EJB or RMI invocations. A client, such as an applet, can obtain a reference to the Transaction and TransactionManager objects, using JNDI, and start a transaction.)

As another example, consider a banking application. The client invokes the transfer operation on a teller object. The transfer operation requires the teller object to make the following invocations on the bank database: invoking the debit method on one account; and invoking the credit method on another account. If the credit invocation on the bank database fails, the banking application needs a mechanism to roll back the previous debit invocation.

A problem with the traditional methods of transaction management described above, is that they do not allow for descriptive or functional properties to be attached to, or associated with a particular transaction. For example, the application or transaction server cannot identify contextual information for any given transaction. This might correlate to a system used by the travel agent not being able to identify a particular customer (and hence transaction) as being, for example, a frequent flyer, and having those particular transactions handled in a different manner, perhaps with a higher priority. The objects being invoked have no knowledge of the transaction context, and cannot make intelligent decisions based on such a context. The increasing complexity of e-commerce applications, and requirements of e-commerce customers, have determined that additional flexibility must be incorporated into transaction messaging or application systems to meet these demands.

SUMMARY OF THE INVENTION

The invention provides a mechanism for use with a transaction processing system that allows a transaction to include a number of associated transaction properties, which in turn allow named objects to be associated with a particular transaction. Transaction properties are available wherever the transaction is active, and can be used as an "attachment" or out-of-band communication mechanism as a transaction flows to various servers in a distributed system.

JTA typically provides support for business transactions. The implementation of JTA provided by an embodiment of the invention provides the following support for business transactions:

Creates a unique transaction identifier when a client application initiates a transaction, and supports an optional transaction name describing the business process that the transaction represents;

Notifies the resource managers-when they are accessed on behalf of a transaction. Resource managers then lock the accessed records until the end of the transaction; and, Orchestrates the two-phase commit when the transaction completes, which ensures that all the participants in the transaction commit their updates atomically, (i.e. either all of the updates are performed, or none of the updates are performed). It coordinates the commit, with any databases that are being updated using Open Group's XA protocol, executes the rollback procedure when the transaction must be stopped, and executes a recovery procedure when failures occur. It determines which transactions were active in the machine at the time of the crash, and then determines whether the transaction should be rolled back or committed.

The JTA provided by the invention also manages transaction time outs-if a business operation takes too much time or is only partially completed due to failures, the system takes action to automatically issue a timeout for the transaction and free resources, such as database locks.

Generally described, one embodiment of the invention comprises a system for associating transaction properties with a transaction during communication of the transaction from a first application process to a second application process, comprising: a first transaction interface, said first transaction interface includes a function for that allows said first application process to specify a transaction property to be associated with a particular transaction; a first transaction manager, said first transaction manager associates said transaction property with said particular transaction; and, a communications mechanism for that communicates said particular transaction with said associated transaction property to a second application process.

Another embodiment of the invention comprises a method for associating transaction properties with a transaction during communication of the transaction from a first application process to a second application process, comprising the steps of: specifying, at a first application process, by calls to a first transaction interface, a transaction property to be associated with a particular transaction; associating, at a first transaction manager, said transaction property with said particular transaction; and, communicating said particular transaction with said associated transaction property to a second application process.

DETAILED DESCRIPTION

Broadly described, the invention provides a system and method for use with a transaction processing or messaging system, that allows a transaction to include one or more associated transaction properties. Transaction properties can be used to allow named objects to be associated with a particular transaction. In this way, they can be used as an out-of-band communication mechanism that provides information from and between servers, as a transaction flows between different servers in a distributed system. While various implementations described herein describe the invention in terms of Java, and particularly EJB implementations, it will be evident to one skilled in the art that the transaction property mechanisms described herein can be used with other systems and other implementations.

Figure 2:
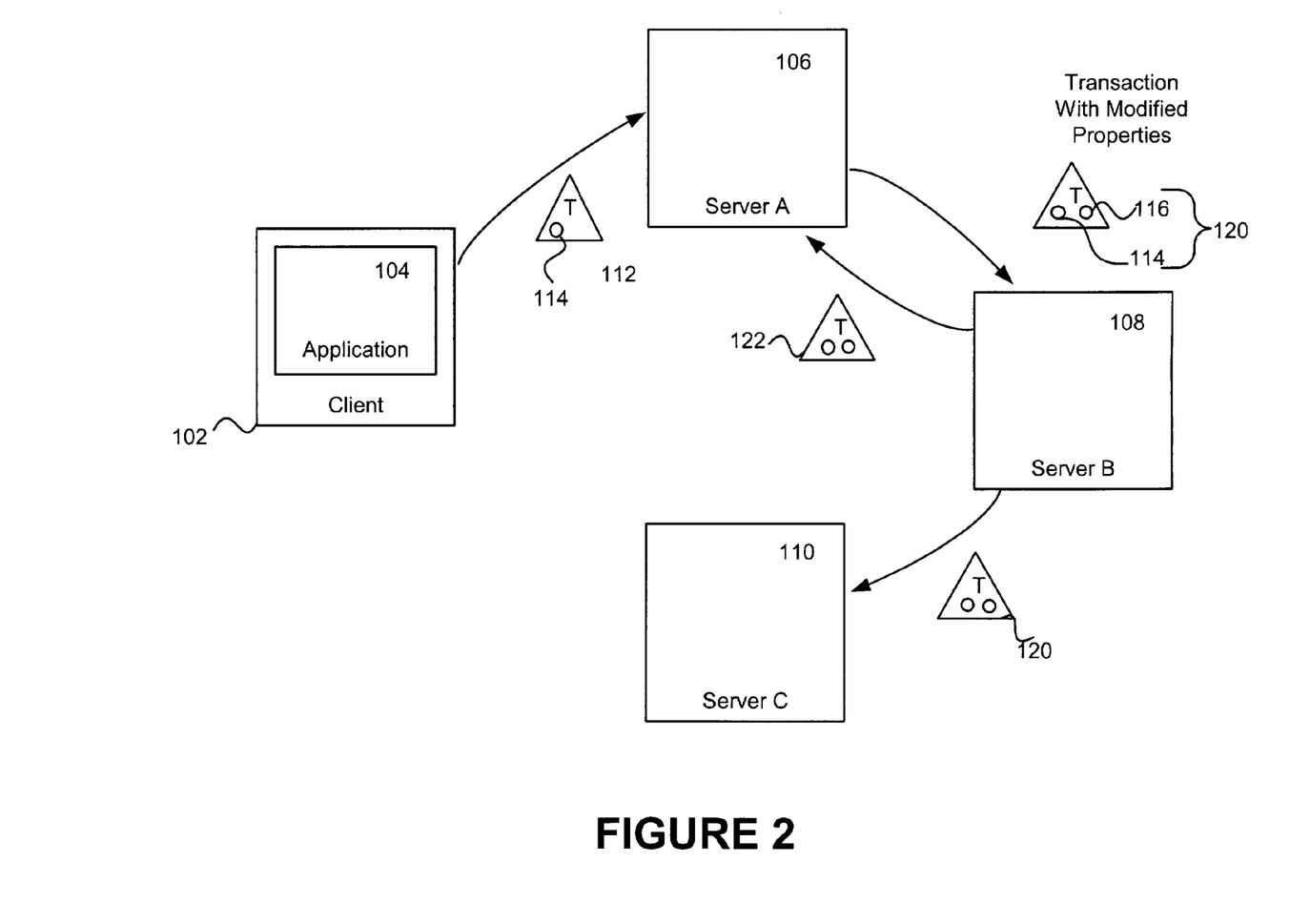
FIG. 2 shows an illustration of a transaction property feature in accordance with an embodiment of the invention.

FIG. 2 shows a schematic illustration of the operation of a transaction property in accordance with one embodiment of the invention. As shown in FIG. 2, a client 102 including a client application 104 communicates with a number of servers, by means of transactions. As shown in FIG. 2, this plurality of servers includes a server A 106, server B 108, and server C 110. Under normal circumstances, any transaction related data that must flow between servers A, B and C, must be passed using an in-band communication, i.e. the information is passed explicitly from one server to another through the use of well defined interfaces. The invention, however allows for the out-of-band communication of transaction related data, i.e. information can be passed implicitly with the actual flow of information, and need not be explicitly sent via an interface. As shown in FIG. 2, for example the client application 104 makes a request on behalf of a transaction 112 to use resources on server A 106. As part of the transaction context, transaction properties 114 may be associated with the transaction 112. Any particular transaction may involve more than one server. In the example shown in FIG. 2, the transaction involves not just server A 106, but also server B 108, and server C 110. As the transaction flows from server A to server B, and then on to server C, the properties associated with that transaction may be modified and/or read by any of the servers. For example, as shown in FIG. 2, when the transaction 112 including transaction property 114 is passed from server A to server B, an additional transaction property 116 may be attached. The combined transaction properties 120 can now be passed to server C as part of the transaction process. At the same time the updated transaction properties 120 can be passed or sent back 122 to server A. These updated transaction properties will also be passed back to server A automatically when the original call (from server A to server B) returns to server A. In this way the system provides an ability for client applications to set transaction properties, that are the propagated across different servers or modules in a distributed system. The effect is to provide an out-of-band communication mechanism for software components that are effected by that particular transaction. Additional implementations describing this mechanism are described in further detail below.

Thus, the invention provides a mechanism for use with any transaction processing system that allows a transaction to include a number of associated transaction properties. The transaction properties in turn allow named objects to be associated with a transaction. Transaction properties are available wherever the transaction is active. They can be used as an attachment or out-of-band communication mechanism as the transaction flows, or is communicated between, the various servers in a distributed system.

In one embodiment the invention provides extensions to the standard Java Transactions API in situations where the standard JTA specification does not cover implementation details, or where additional capabilities are required. The invention also provides the ability to allow client-initiated transactions. The standard JTA transaction manager interface (javax.transaction.TransactionManager) is made available to clients and bean providers through the Java Named Directory Interface (JNDI). This interface allows clients and EJBs using bean-managed transactions to suspend and resume transactions. The scope of transactions-transactions can operate both within and between clusters.

Figure 3:
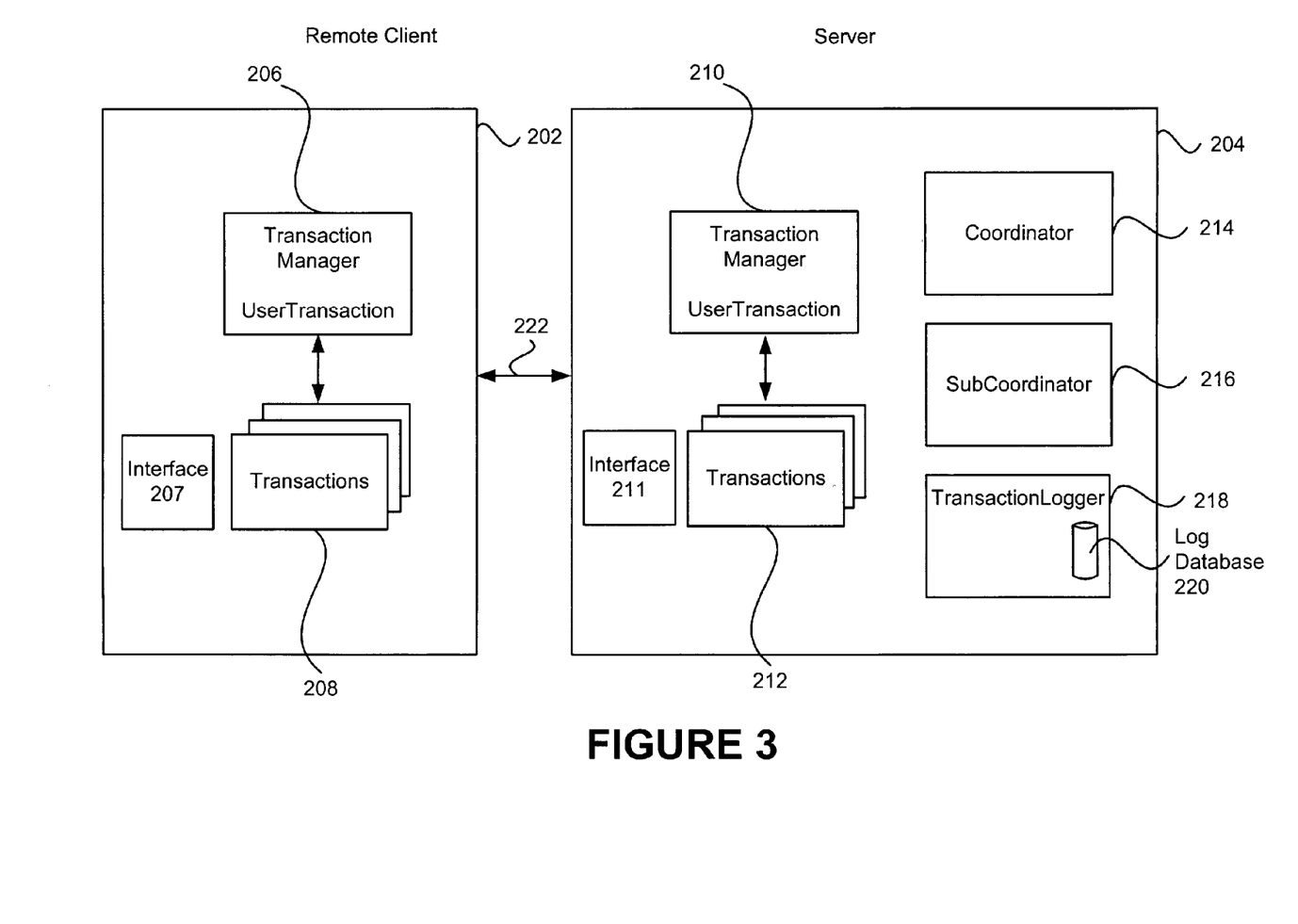
FIG. 3 shows an illustration of a typical system for use with the invention.

FIG. 3 shows a schematic of a typical system that can make use of the invention. A remote device or application 202, commonly referred to as a client application, communicates with an application server 204 or more typically with an application hosted at the application server. At the client end, a transaction manager 206 is used by the client applications to send and receive transactions 208, 212 to and from the server (or to and from many servers) via an interface 207. Similarly, at the server end a transaction manager 210 and interface 211 is used to manage transactions with the clients. In one embodiment any server may act as a transaction coordinator 214 for initiating the transaction, subcoordinator 216 for monitoring transaction status, or transaction logger 218 for logging transactions. It will be evident that each of these tasks can also be handled by the same (i.e. one) server, rather than by a group of servers. As transactions occur they can be recorded in a transaction database 220 for later audit, reference, or rollback purposes. The invention provides a transaction manager that allows properties to be associated with each transaction. A client or server application can then analyze these properties as the transaction is communicated 222, and react accordingly.

To accomplish this functionality, one embodiment of the invention provides a set of classes and interfaces as extensions to the standard JTA (note that although the name "Weblogic" is used in some of the following examples for illustrative purposes in order to distinguish new classes from the standard J2EE/JTA classes, that the invention is not limited to Weblogic systems specifically, nor to the example classes or interfaces presented below):

Transaction Properties

Figure 4:
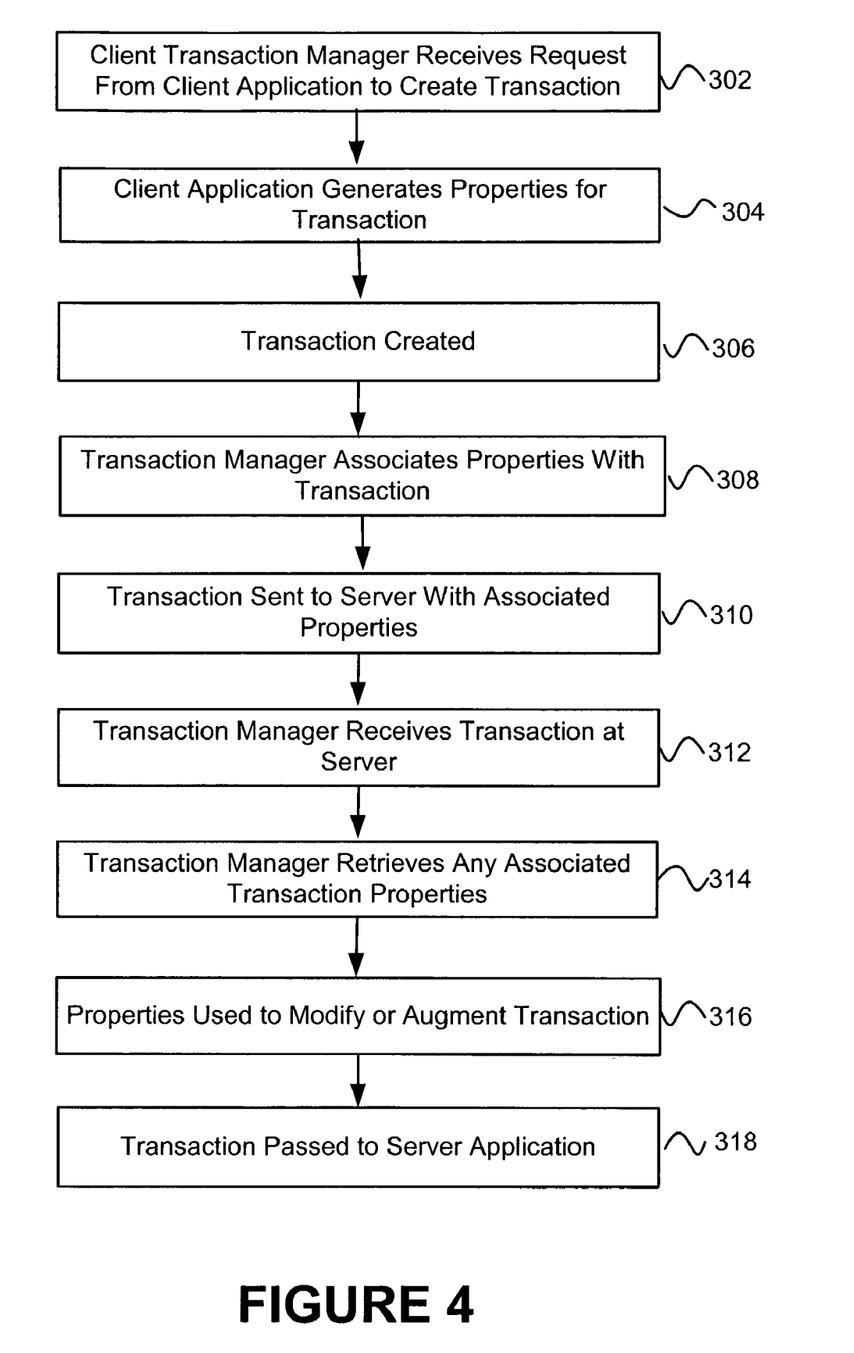
FIG. 4 shows a flowchart a transaction property process in accordance with an embodiment of the invention.

FIG. 4 shows a flowchart of a transaction property process in accordance with an embodiment of the invention. As shown in FIG. 4, the client's transaction manager receives a request from the client application to create or initiate a transaction (step 302). The client application, which in some cases may actually be a different participating client application, may also, in step 304, generate properties to be associated with that transaction.

In step 306, the client application or some external application generates properties for transaction. The client transaction manager receives a request from the client application to create the transaction, and associates any desired properties with the transaction (step 308). In step 310 the transaction is sent to the server together with the associated properties. The transaction manager receives the transaction at the server (step 312), at which point the transaction manager retrieves any associated transaction properties (step 314). Any properties found to be associated with the transaction are used to modify or augment the transaction (step 316), and the transaction is passed to the server application (step 318).

In accordance with one embodiment transaction properties are key/value pairs, in that they include one or more keys together with associated values. Once a transaction property is set, it remains associated with a transaction during its entire lifetime. The properties are propagated between machines (computers) as the transaction travels throughout the system. Properties may also be saved in the transaction log, and restored during crash recovery processing. In accordance with on embodiment of the invention, if a transaction property is set more than once then the latest value is retained. However, in some threaded and/or multi-server situations, this behavior may not be desirable or even predictable.

Recovery and audit-trail procedures typically require more information about a transaction than the JTA Transaction interface furnishes; such as information about the transaction type, the transaction identifier, the specific reason for a rollback, and any heuristic error messages. The time taken by the transaction and the amount of time left can be used as limits on certain operations.

In accordance with one embodiment of the invention, to set transaction properties, a getProperty/setProperty interface is used by the user of the transaction service (or client application) to propagate extra information along with the transaction context. Keys can be strings, while values can be any serializable entity. Some keys, such as for example those beginning with the word "weblogic." may be reserved or have a special meaning; others are not interpreted by the service but are propagated with the transaction and are made available to transaction intermediaries and recipients as the transaction flows through the system.

Transaction Interfaces

Transaction interfaces are used to control the functioning of the transaction property features. The following interfaces illustrate a particular implementation of the invention as it can be applied to a Weblogic Server system. It will be evident to one skilled in the art that the interfaces and techniques described below can be modified for use with other systems while remaining within the spirit and scope of the invention.

weblogic.transaction.TransactionManager

This Transaction Manager interface extends the J2EE standard javax.transaction.Transaction Manager interface, and is supported by the JTA transaction manager object. It allows XA resources to register and unregister themselves with the transaction manager upon startup. The TransactionManager can be referenced through JNDI to avoid having to import any application-server-specific classes:

```
javax.naming.Context ctx = getInitialContext ( );
TransactionManager tm = (TransactionManager)
ctx.lookup ("javax.transaction.TransactionManager");
tm.begin( ); // begin a transaction.
Transaction tx = tm.getTransaction( );
tm.commit ( );
```

The transaction manager can be cached and used by all application threads. In this manner the JNDI lookup need only be done once in the lifetime of the process. Obtaining and using a User Transaction follows the same pattern as above. It can be obtained from JNDI and subsequently cached and reused.

```
javax.naming.Context ctx = getInitialContext ( );
UserTransaction ut = (UserTransaction)
ctx.lookup("javax.transaction.UserTransaction");
ut.begin( ); // begin a transaction.
ut.commit ( );
``` weblogic.transaction.Transaction

The weblogic.transaction.Transaction interface is a transaction interface that extends the standard javax.transaction.Transaction, and allows users or applications to get and/or set transaction properties. In one embodiment the transaction interface includes the following methods:

setName(java.lang.String n)

The setName( ) method or function associates a name with a transaction. The name of the transaction is intended as a reference to the application-specific semantic meaning (the 'type') of a transaction and is not intended to be unique for every instance of a transaction. The transaction name thus may be considered to represent a class of business transactions. Assigning a name to a transaction provides better error reporting. Internally generated error reports incorporate the name if one is present. For example, the function tx.setName("funds transfer") can be used in a financial services operation to give a transaction the name "funds transfer".

getName()

The getName() function retrieves the name previously associated with a transaction, (ie. it returns the transaction name).

addProperties(java.util.Map props)

The addProperties() function adds a set of properties to a transaction by calling setProperty for each element of the properties. It accepts as parameters a plurality of properties—(ie. a set of key/value pairs to add).

setProperty(java.lang.String key, java.io.Serializable value)

The setProperty() function sets a property value to be associated with a transaction. This function accepts as parameters a key—(a string key), and a value—(a Property value, wherein a value of null means to delete the property).

getProperty(java.lang.String key)

The getproperty() function gets the value of a specific property, and accepts as parameters a key—(property name). The function returns the value of property, or null if unset.

getProperties()

The getProperties() function gets all properties currently associated with a transaction. The function returns an object containing all key/value pairs.

setRollbackOnly(java.lang.String msg, java.lang.Throwable reason)

The setRollbackOnly() function wraps the rollback string message and the exception into a NestedException instance and calls setRollbackOnly with this new exception.

setRollbackOnly(java.lang.Throwable reason)

This function() provides a reason for any rollback that takes place. All rollbacks triggered inside the transaction service set the reason (time outs, XA errors, unchecked exceptions in before Completion, inability to contact the coordinator, etc.) This function accepts as parameters a value for reason—(the reason behind the rollback).

getRollbackReason

The getRollbackReason() function retrieves the rollback reason (if any) associated with the transaction, and returns the rollback reason to any calling application.

getHeuristicErrorMessage()

The getHeuristicErrorMessage() function returns the heuristic error message (if any) associated with the transaction.

getXID()

The getXID() function gets the transaction identifier. In some instances, the transaction process may add some extra information to the Xid's qualifier when it calls a resource, so subsequent calls to tx.getXID().getGlobalTransactionId() before calling a resource (for the first time) and then after calling a resource may differ in what is actually returned.

For example in a financial services scenario the transaction identifier (xid) may include branch qualifiers indicating the branch initiating the transaction. When the transaction is forwarded to another branch, this qualifier may be modified, without modifying the content of the transaction itself. In some embodiments a number of guarantees are provided by the system:

1. xid.equals() is not affected. An xid obtained from tx.getXID() and another obtained at a subsequent time are considered equal (for the same transaction). This guarantee is not extended to the constituents of the xid, namely the qualifiers.
2. An XA resource is always supplied the same xid (with the same qualifiers) for a given transaction, in all its XAResource methods.

getStatusAsString

The getStatusAsString() function returns the status of the transaction as a string. The string contains the major state as specified in javax.transaction.Status, further embellished with a minor state (such as "logging", "pre-preparing", etc.).

getMillisSinceBegin()

The getMillisSinceBegin() function returns the amount of time, in milliseconds, that the transaction has been in existence.

getTimeToLiveMillis()

The getTimeToLiveMillis() function returns the amount of time, in milliseconds, that the transaction has left to live. This time is meaningful only when the transaction is active, and not when it is retrying a commit or rollback.

weblogic.transaction.TxHelper

The TxHelper class allows the user or application to obtain the current transaction manager and transaction.

import weblogic.transaction.TxHelper;

TransactionManager tm=TxHelper.getTransactionManager ();

Transaction tx=TxHelper.getTransaction();

The Transaction object can be cast to an extension of the Transaction interface for transporting other contextual data and to obtain detailed status information.

```
import weblogic.transaction.Transaction;
Transaction tx = (Transaction) TxHelper.getTransaction( );
``` weblogic.transaction.XAResource

This interface provides delistment capabilities for XA resources. The XA resource interface also represents the resource contract in the participation of the Two Phase Commit protocol, which includes enlistment, delistment, prepare, commit, rollback and recovery. The JTA specification does not standardize certain details, such as how a transactional resource is initialized, or how a user or application is expected to obtain an object that implements the TransactionManager or UserTransaction interface. The following sections disclose such details, and in addition describe, by way of example, a number of the extensions to the Transaction and TransactionManager interfaces that can be provided by the invention.

Figure 5:
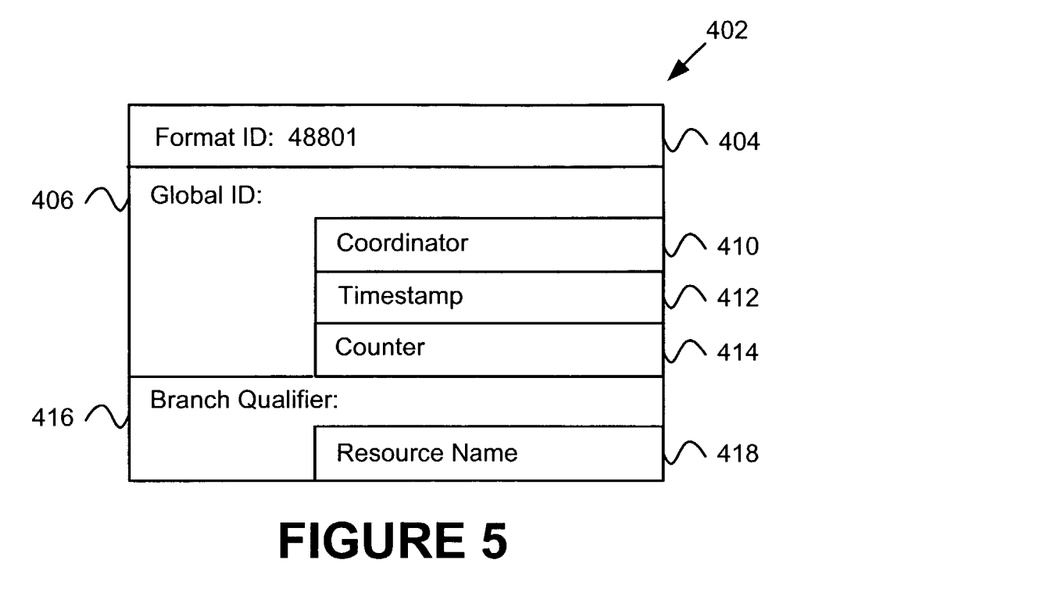
FIG. 5 shows an illustration of a representation of a transaction including a transaction property in accordance with an embodiment of the invention.

FIG. 5 shows an illustration of a representation of a transaction 402 including transaction properties in accordance with an embodiment of the invention. The transaction format shown is merely as an example of one that might be used in a financial services environment, and includes a Format ID 404, Global ID 406, Coordinator 410, Timestamp 412, Counter 414, Branch Qualifier 416 and Resource Name 418. This transaction format can be used to add properties or qualifiers to a particular transaction, perhaps to distinguish that transaction as belonging to a particular class of customer (i.e. a "gold" or "platinum" level customer for example), or perhaps to identify an originating or intermediate bank branch. It will be evident to one skilled in the art that the example format shown is merely an illustration of one embodiment, and that other formats may be used while remaining within the spirit and scope of the invention.

Figure 6:
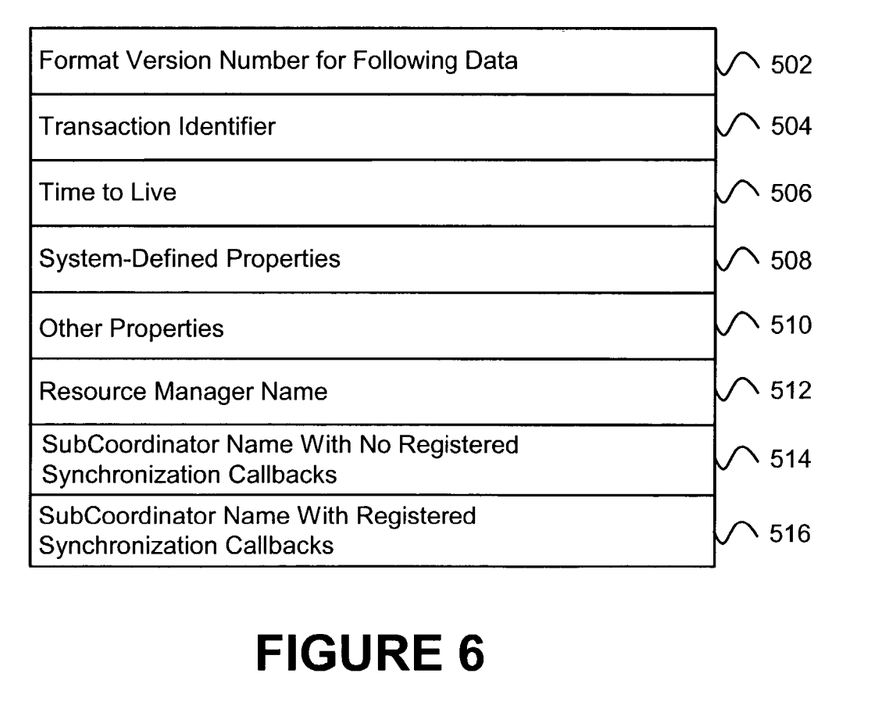
FIG. 6 shows an illustration of various transaction property fields in accordance with an embodiment of the invention.

FIG. 6 shows an illustration of various transaction property fields in accordance with an embodiment of the invention. The properties include Format Version Number for Following Data 502, a Transaction Identifier 504, a Time to Live 506, a System_Defined Properties field 508, Other Properties 510, a Resource Manager Name 512, SubCoordinator Name With No Registered Synchronization Callbacks 514 and SubCoordinator Name With Registered Synchronization Callbacks 516. Some of these fields may be necessary, or can be considered optional fields.

Referencing to the TransactionManager and UserTransaction

While the JTA specification specifies these interfaces, it does not mandate a way to get at the current transaction; only the EJB specification provides a way to do so from within a bean. Using the invention one does not have to import any specific classes to obtain reference to these interfaces.

Support for Client-initiated Transactions

The JTA specification does not clearly define whether a client such as an applet can obtain a reference to the TransactionManager and start transactions. Using the invention this is now possible. The J2EE standards allow J2EE clients to portably obtain a reference to a UserTransaction object using JNDI; with the invention this facility is also available for both the Transaction and TransactionManager objects.

Ability to Span Clusters and Unclustered Servers

The invention allows a transaction to be forwarded wherever a remote method call is possible. All servers touched within the scope of a particular transaction are coordinatable, within any constraints imposed by security settings or preferences.

User-Defined Data Section

Because the transaction context implicitly follows the thread of control and because a transaction boundary typically represents an atomic business task, the invention provides a way to name transactions by their type (for example "funds transfer"), and to carry user-defined data structures together with the context. This information can then be used for error reporting and statistics-gathering reasons.

Error Reporting

To improve its error reporting, in accordance with an embodiment of the invention the JTA service can provide applications with a way to obtain the underlying reason for a transaction rollback, or to supply a reason before calling setRollbackOnly() or rollback(). The standard Java-specification JTA service does not provide for this requirement. The invention also allows one to obtain the transaction identifier and a detailed status report; and ensure that all messages include sufficient detail to make sense at the business level. Most traditional transactional systems would simply list a set of transaction identifiers and their status, which makes little or no sense to an operator.

Support for Beans Invoking During beforeCompletion

Neither the standard EJB nor the standard JTA specifications define how to handle those cases where a bean's beforeCompletion or ejbStore method invokes another bean whose beforeCompletion and/or ejbStore method has already been called. The invention supports such a scenario across servers. Any new servers or resources contacted as a result of the application code running in a beforeCompletion() callback method are tracked. The system then ensures that these servers and resources participate fully in transaction commit processing, including making additional beforeCompletion() callbacks if necessary.

EJB Interactions

When using EJB's to generate a managed transaction, the EJB container automatically sets the transaction name whenever it begins a transaction. If the deployer has not supplied a name in the deployment descriptor, then the EJB service supplies the class.method name as the default name of the transaction. The EJB container can automatically set a transaction timeout whenever it begins a transaction. If the deployer has not supplied a timeout value in the deployment descriptor, the EJB container sets the timeout to zero. In this case, the default timeout based on configuration parameters is used. An EJB deployment descriptor can specify properties that are set for any transactions begun by the EJB container. One useful property that may be set is a transaction tracing property. The tracing property allows tracing to be initiated on one server, and then to flow across a network with the transaction to a second server. The tracing is specific only to the thread of control associated with a single transaction, which is an advantage in a busy production system. Tracing output is printed in each server's error log file, and is useful for diagnosing problems with either application code, system code, resources, or configuration settings.

JMS Interactions

JMS receives configuration parameters in order to control the transaction name, timeout, and transaction properties.

EXAMPLE OF IMPLEMENTATION

Figure 7:
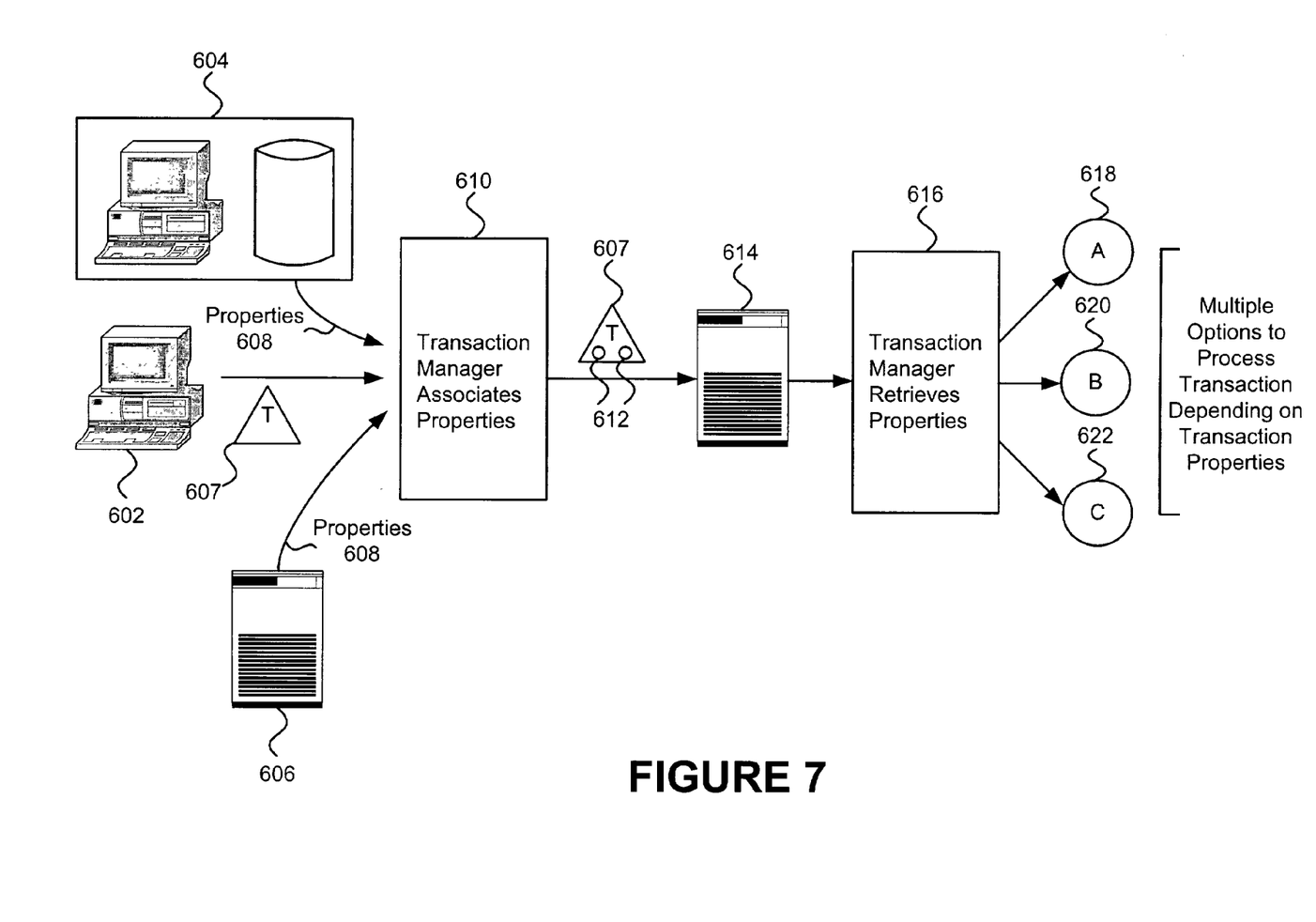
FIG. 7 shows an example of a system for use with or incorporating an embodiment of the invention.

FIG. 7 illustrates an example of a system for use with or incorporating the invention. As shown therein a client or client application 602 generates a transaction 607. Other client applications 604, or server processes or functions 606 may wish to modify or augment the transaction, perhaps adding properties 608 that identify the transaction as belonging to a very important customer, or a frequent flyer customer, etc. A transaction manager process 610, operating in communication with the client, either as a process running at the client or on an intermediate server, is used to associate properties with the transaction, for example by using a setProperty command or set property interface. The transaction 607, together with the associated properties 612, is then passed to a recipient server (or servers) 614, where another transaction manager 616 retrieves the associated transaction properties, for example by using a getProperty interface. Depending on the associated properties, the receiving recipient servers or processes may operate upon the transaction in a plurality of different ways (618, 620, 622) to suit their needs.

Figure 8:
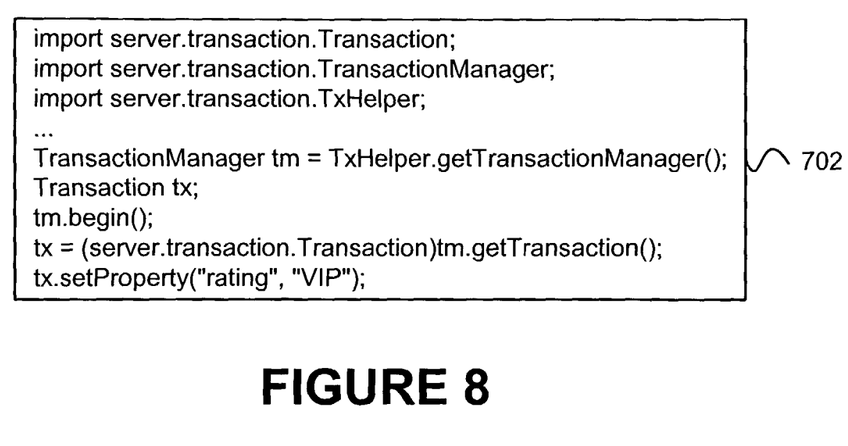
FIG. 8 shows a listing of a sample code setting a transaction property pair in accordance with an embodiment of the invention.

FIG. 8 shows a listing of a sample code 702 for setting a transaction property pair in accordance with an embodiment of the invention. Again, this example also relates to a financial services environment, in which transactions are passed back and forth between a client application and a server application, perhaps to effect account credits, debits, equity sales, etc. In the example shown in FIG. 8 a client application uses the setProperty function to associate a valued customer property ("rating"="VIP") with a particular transaction. This "VIP" property travels with the transaction as a transaction property as the transaction flows from client to server, or perhaps from one server to another server, throughout the entire system.

Figure 9:
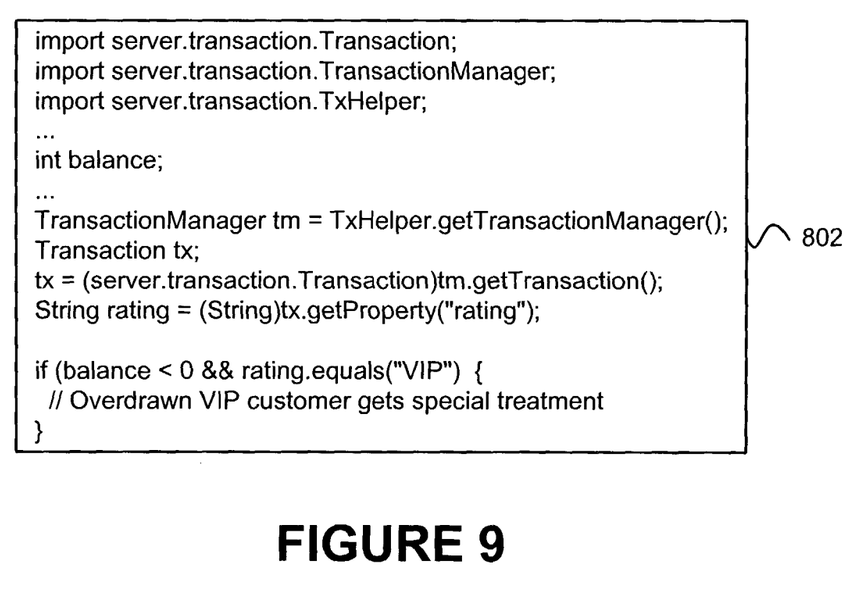
FIG. 9 shows a listing of a sample code for retrieving a transaction property pair in accordance with an embodiment of the invention.

FIG. 9 shows a listing of a sample code 802 for retrieving a transaction property pair in accordance with an embodiment of the invention. In this example, the "VIP" transaction property previously associated with the transaction is retrieved by a server application, using for example a call to getProperty. Here, the server application retrieves a value for "rating" which identifies or augments the properties of the originator or owner of the transaction. In the example shown in FIG. 9, a value of "rating" equal to "VIP" indicates that the transaction should receive special treatment. The server application can respond appropriately to this transaction property, perhaps by processing the transaction request at a higher priority, or by forwarding the transaction to a special server dedicated to handling only "VIP" transactions.

The foregoing description of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system that associates transaction properties with a transaction during communication of the transaction from a first application process to a second application process, comprising:

a first transaction interface including a function that allows said first application process to specify a transaction property to be associated with a particular transaction;

a first transaction manager that associates said transaction property with said particular transaction, and allows a named object to associated with a transaction;

a communications mechanism that communicates said particular transaction together with said associated transaction property from said first transaction manager to a second transaction manager;

a second transaction manager that retrieves said transaction property associated with said particular transaction; and, a second transaction interface including a function that allows said second application process to read said transaction property associated with said particular transaction, and to modify or augment the transaction with additional transaction properties.

2. The system of claim 1 wherein said transaction interface includes a plurality of functions that allows said first application process to specify a transaction property to be associated with a particular transaction, and further wherein a plurality of transaction properties may be associated with said particular transaction.

3. The system of claim 1 wherein said first transaction interface includes a setProperty function for use by the first application process to propagate extra information along with the transaction context.

4. The system of claim 1 wherein said transaction property is a key value pair, further wherein said key element of said key value pair is a string, and said value element of said key value pair is a serializable entity.

5. The system of claim 1 wherein said transaction interface extends the Java transaction interface.

6. The system of claim 1 wherein said function is a setName function for associating a transaction name with a transaction.

7. The system of claim 6 wherein said setName function is used to name transactions by their transaction type.

8. The system of claim 1 wherein said transaction interface includes an addProperties function for associating a property type with said particular transaction.

9. The system of claim 5 wherein said interface further includes a setProperty function for setting the value of a property type previously associated with said particular transaction.

10. The system of claim 1 wherein a unique transaction identifier is created by said transaction manager when said first application process initiates a transaction.

11. The system of claim 1 wherein the second transaction manager communicates a transaction reply to the first transaction manager upon retrieving said transaction property.

12. A method for associating transaction properties with a transaction during communication of the transaction from a first application process to a second application process, comprising the steps of:

specifying, at a first application process, by calls to a first transaction interface, a transaction property to be associated with a particular transaction;

associating, at a first transaction manager, said transaction property with said particular transaction, wherein said transaction property allows a named object to associated with a transaction;

communicating said particular transaction with said associated transaction property to a second application process;

retrieving at a second transaction manager, said transaction property associated with said particular transaction, and, reading, at a second application process, by calls to a second transaction interface, said transaction property associated with said particular transaction, and to modify or augment the transaction with additional transaction properties.

13. The method of claim 12 further including the step of replying to said first transaction manager after retrieving the transaction property associated with the particular transaction.

14. The method of claim 12 wherein said transaction interface includes a plurality of functions for allowing said first application process to specify a transaction property to be associated with a particular transaction, and further wherein a plurality of transaction properties may be associated with said particular transaction.

15. The method of claim 12 wherein said first transaction interface includes a setProperty function for use by the first application process to propagate extra information along with the transaction context.

16. The method of claim 12 wherein said transaction property is a key value pair, further wherein said key element of said key value pair is a string, and said value element of said key value pair is a serializable entity.

17. The method of claim 12 wherein said transaction interface extends the Java transaction interface.

18. The method of claim 12 wherein said function is a setname function for associating a transaction name with a transaction.

19. The method of claim 18 wherein said setname function is used to name transactions by their transaction type.

20. The method of claim 12 wherein said transaction interface includes an addProperties function for associating a property type with said particular transaction.

21. The method of claim 20 wherein said interface further includes a setProperty function for selling the value of a property type previously associated with said particular transaction.

22. The method of claim 12 wherein a unique transaction identifier is created by said transaction manager when said first application process initiates a transaction.

23. A system that associates transaction properties with a transaction during communication of the transaction from a first application process to a plurality of other application processes, comprising:

a server having a first application process, and a first transaction interface that allows said first application process to specify transaction properties to be associated with a transaction;

a first transaction manager that associates said transaction properties with said transaction and communicates said transaction together with said associated transaction properties from said first transaction manager to a plurality of other application processes; and a plurality of other application processes, wherein each of said plurality of other application processes include a transaction manager and a transaction interface associated therewith, and wherein each of the plurality of other application processes can receive the transaction together with said associated transaction properties, and can independently modify or augment the transaction properties, before communicating the transaction to another application process, or replying to the first application process.

24. A method for associating transaction properties with a transaction during communication of the transaction from a first application process to a plurality of other application processes, comprising the steps of:

generating a transaction at a first application process;

specifying a transaction property to be associated with the transaction;

associating said transaction property with the transaction;

communicating the transaction with the associated transaction property to a plurality of other application processes; and wherein each of the plurality of other application processes receive the transaction together with the associated transaction property, and can independently modify or augment the transaction property, before communicating the transaction with any modified or augmented properties to another application process, or replying to the first application process.

* * * * *

UNITED STATES PATENT AND TRADEMARK OFFICE
CERTIFICATE OF CORRECTION

PATENT NO. : 7,213,049 B2
APPLICATION NO. : 10/196687
DATED : May 1, 2007
INVENTOR(S) : Felt et al.

It is certified that error appears in the above-identified patent and that said Letters Patent is hereby corrected as shown below:

Col. 17, line 3, after "to" insert --be--.
Col. 17, line 60, after "to" insert --be--.
Col. 17, line 41, delete "5" and insert --8--.
Col. 18, line 38, delete "selling" and insert --setting--.

Signed and Sealed this

Sixth Day of November, 2007

JON W. DUDAS
*Director of the United States Patent and Trademark Office*